United States Patent
Gruenbeck

(10) Patent No.: US 10,792,979 B2
(45) Date of Patent: Oct. 6, 2020

(54) AIR VENT

(71) Applicant: DR. SCHNEIDER KUNSTSOFFWERKE GMBH, Kronach (DE)

(72) Inventor: Thomas Gruenbeck, Teuschnitz (DE)

(73) Assignee: DR. SCHNEIDER KUNSTSTOFFWERKE GMBH (DE)

( * ) Notice: Subject to any disclaimer, the term of this patent is extended or adjusted under 35 U.S.C. 154(b) by 0 days.

(21) Appl. No.: 16/074,740

(22) PCT Filed: Jun. 19, 2017

(86) PCT No.: PCT/EP2017/064071
§ 371 (c)(1),
(2) Date: Aug. 1, 2018

(87) PCT Pub. No.: WO2017/216046
PCT Pub. Date: Dec. 21, 2017

(65) Prior Publication Data
US 2019/0135085 A1    May 9, 2019

(30) Foreign Application Priority Data
Jun. 15, 2016  (DE) .......................... 10 2016 110 933

(51) Int. Cl.
*B60H 1/34*   (2006.01)
*F24F 13/06*  (2006.01)

(52) U.S. Cl.
CPC ... *B60H 1/3414* (2013.01); *B60H 2001/3478* (2013.01); *F24F 13/06* (2013.01); *F24F 2221/28* (2013.01)

(58) Field of Classification Search
CPC .......... B60H 1/3414; B60H 2001/3478; B60H 1/3407; B60H 1/3442; F24F 13/06;
(Continued)

(56) References Cited

U.S. PATENT DOCUMENTS

| 4,407,186 | A |   | 10/1983 | Izumi et al. ........................ 98/2 |
| 6,016,976 | A | * | 1/2000  | Kern ..................... B60H 1/3428 239/461 |

(Continued)

FOREIGN PATENT DOCUMENTS

| DE | 102008050180 A1 | * | 4/2010 | ............... B60H 1/34 |
| DE | 102009041532    |   | 4/2011 | ............... B60H 1/34 |

(Continued)

OTHER PUBLICATIONS

Tuechsen, Wolfgang, DE102008050180 Translation.pdf, "Air outlet nozzle for ventilation system", Apr. 2010, pp. 1-12.*

(Continued)

*Primary Examiner* — Grant Moubry
*Assistant Examiner* — Ryan L Faulkner
(74) *Attorney, Agent, or Firm* — Hayes Soloway P.C.

(57) ABSTRACT

An air vent is described, having a housing with an air inlet section, a main air channel, and an air outlet section, the main air channel having at least two opposing sections, which reduce the size of the main air channel starting from the air inlet section and starting from the air outlet section. At least two air channels, which lead into the main air channel via outlet openings, are arranged behind the sections. A pivotably mounted flap, which closes the air channel when in a non-actuated position, is located in the region of inlet openings in each of the air channels. In addition, at least one control element on a control member and a drive unit are provided, wherein the flaps can be pivoted via the at least one control element by means of pivot levers. The Coanda effect is used to deflect the air.

9 Claims, 7 Drawing Sheets

(58) Field of Classification Search
CPC ........ F24F 2221/28; F24F 13/08; F24F 13/10; F24F 1/028
USPC .......................................................... 454/152
See application file for complete search history.

(56) References Cited

U.S. PATENT DOCUMENTS

| | | | |
|---|---|---|---|
| 9,513,027 B2 | 12/2016 | Londiche et al. | ...... F24F 13/10 |
| 2008/0014855 A1 | 1/2008 | Leserre | .......................... 454/155 |
| 2015/0090508 A1* | 4/2015 | Chappex | .............. B60K 11/085 180/68.1 |
| 2016/0236541 A1 | 8/2016 | Gruenbeck et al. | ......................... B60H 1/3414 |

FOREIGN PATENT DOCUMENTS

| | | | |
|---|---|---|---|
| DE | 102011084439 | 4/2013 | ............... B60H 1/34 |
| DE | 102013111175 | 9/2014 | ............... B60H 1/34 |
| DE | 102013210055 | 9/2014 | ............... B60H 1/34 |
| EP | 1331116 | 7/2003 | ............... B60H 1/34 |
| FR | 2772311 | 6/1999 | ............... B60H 1/34 |
| FR | 2794690 | 12/2000 | ............... B60H 1/34 |
| FR | 2872260 | 12/2005 | ............... B60H 1/34 |
| FR | 2915137 | 10/2008 | ............... B60H 1/34 |
| JP | S60182641 | 12/1985 | ............... B60H 1/34 |

OTHER PUBLICATIONS

German Office Action (w/machine translation) issued in application No. 10 2016 110 933.9, dated Jan. 20, 2017 (5 pgs).
International Preliminary Report on Patentability issued in application No. PCT/EP2017/058598, dated Mar. 15, 2018 (6 pgs).
International Preliminary Report on Patentability issued in application No. PCT/EP2017/064071, dated Aug. 18, 2017 (13 pgs).
International Search Report and Written Opinion issued in application No. PCT/EP2017/064071, dated Jun. 7, 2018 (7 pgs).
International Preliminary Report on Patentability (English translation) issued in application No. PCT/EP2017/064071, dated Dec. 20, 2018 (7 pgs).

* cited by examiner

AIR VENT

BACKGROUND OF THE INVENTION

An air vent comprising a housing with an air inlet section, a main air channel and an air outlet section, which is constructed as a so-called slat-free air vent, is described. In slat-free air vents deflection of the output air frequently takes place with utilisation of Coanda effect, in which elements for control of the direction of the output air are arranged in a region remote from the air outlet section. The desired air deflection in that case is realised through special feed of an air jet onto curved regions.

Air vents of that kind are used in, for example, dashboards of motor vehicles. In addition, air vents are used in various vehicles as well as ships and aircraft. Air vents can also be arranged in a motor vehicle in regions other than a dashboard. For example, air vents are arranged in the region of B or C pillars. Air vents constructed as air nozzles can be arranged at, for example, a vehicle roof.

A twist device for an air vent is known from DE 10 2009 041 532 A1. This twist device comprises a hub, an adjusting axle and a first air guide element rotatably mounted in the hub and extending radially of the hub. The first air guide element is adjustable by rotation of the adjusting axle. In addition, at least one second air guide element rotatably mounted in the hub and extending radially of the hub is present. The first air guide element has at the end thereof remote from the hub a toothed segment which engages in a toothed segment of a gear ring rotatable about the adjusting axle and which co-operates therewith. The second air guide element has at the end thereof remote from the hub a toothed segment which similarly engages in a toothed segment of the gear ring and co-operates therewith. Moreover, the first air guide element has a further toothed segment engaging in a toothed segment coupled with the adjusting axle.

A twist device for ventilation in a motor vehicle, which enables simple setting of air circulation through a special shaping, is known from FR 2 794 690 A1. A housing open on two opposite sides so that an air flow can be guided through the housing is provided. Arranged in the housing on the centre axis thereof and parallel to the air flow to be conducted through are slats which can be adjusted relative to the air flow direction in response to a rotatable control element.

JP S60 182641 U discloses an air vent with an enlarging primary air channel and two opposite secondary air channels. The secondary air channels have openings by way of which air is introduced perpendicularly to the main axis of the primary air channel. In that case it is significant that the curvature in the primary air channel is downstream of the openings in air flow direction. In order to achieve deflection of the air discharged by way of the primary air channel, air is fed to the primary air channel via one of the two secondary air channels. Provided for that purpose are pivotable flaps which control the air feed from a main air channel to the secondary air channels. The maximum deflection of the output air in the air vent described in JP S60-182641 U is very small.

U.S. Pat. No. 4,407,186 A discloses an air vent with slats for air deflection and an air channel section with opposite, curved channel walls. The channel walls have in the region of the smallest spacing from one another free spaces which form vacuum regions when the air flows along and which thus assist air deflection along the curved channel walls. An air channel, which can be closed by way of an electromagnet and a flap, communicates with one of the free spaces. If the flap is open the air flows along the opposite side channel wall, since an air flow is issued to the channel wall by way of the free space. If the flap is closed the air flows along this channel wall, since a sub-atmospheric pressure is produced in the corresponding free space.

FR 2 772 311 A1 discloses an air vent with a main air channel and an auxiliary air channel, wherein air can be introduced by way of the auxiliary air channel into the air flow via the main air channel. In addition, FR 2 772 311 A1 discloses a ventilating ring comprising a plurality of vent openings having a directional air channel. The direction of the air issued by way of the vent openings can be varied by rotation of the ventilating ring.

An air vent comprising a housing with an air outlet opening, a first connection to an air feed channel and a continuous flow channel is known from DE 10 2013 111 175 B3. The flow channel is formed to be curved in such a way at at least two opposite sections that the cross-section of the flow channel increases towards the air outlet opening and the at least two sections have openings which each communicate with a respective chamber lying behind the sections. The chambers each have a second connection, which is separate from the first connection, for the feed or discharge of air for producing over-pressure and/or sub-atmospheric pressure.

The devices needed for producing over-pressure and/or sub-atmospheric pressure are disadvantageous in the air vent known from DE 10 2013 111 175 B3. Special devices have to be arranged for that purpose so that a desired air deflection can be achieved. Air deflection solely by the curved surfaces is not possible. In particular, it is not possible to achieve deflection solely by the air fed via a feed channel. The air for producing over-pressure in the chambers can indeed be extracted from the feed channel, but has to be separately guided by way of a pressure-generating device. In that case it is necessary to take into account that the air, which is extracted from the feed channel, for producing over-pressure does not excessively reduce the main air flow through to the flow channel. Equally, the air, which is discharged from the chambers, for producing sub-atmospheric pressure has to be discharged by way of a separate device.

SUMMARY OF THE INVENTION

Accordingly, the object consists of indicating an air vent producing air deflection with use of Coanda effect, in which no additional devices are needed for producing sub-atmospheric pressure and/or over-pressure. In addition, an air vent shall be indicated which provides air deflection in all directions by one drive unit alone.

An air vent which fulfils the aforesaid object comprises a housing with an air inlet section, a main air channel and an air outlet section, wherein the main air channel has at least two opposite sections which reduce the main air channel starting from the air inlet section and starting from the air outlet section, wherein at least two air channels opening by way of outlet openings into the main air channel are arranged behind the sections, wherein a respective pivotably mounted flap which in an unactuated setting closes the air channel is arranged in the region of inlet openings of the air channels, wherein in addition at least one control element and a drive unit are provided and wherein the at least one control element is coupled with the drive unit and the flaps are pivotable by way of the at least one control element.

The housing of the air vent can have different cross-sectional shapes. Thus, the air vent can have a round, rectangular or polygonal cross-section. However, the main air channel has at least two opposite sections which initially narrow the flow cross-section through the main air channel and subsequently enlarge it again. The opposite sections are preferably formed to be encircling, for example in the case of a round air vent.

The narrowing of the main air channel produces acceleration of the air flow. Through the widening of the main air channel in the air outlet section an air deflection takes place with utilisation of Coanda effect, in which case for that purpose the air outlet section has appropriately curved regions. However, deflection of the air flow occurs predominantly by way of the air channels which communicate with the main air channel substantially in the air outlet section. Starting from the air outlet openings, the air channels have a reducing cross-section so that acceleration of the air flow guided thereby also takes place in that case. In order that air can flow in the air channels, the pivotably mounted flaps— each flap is provided for a separate air channel—are pivoted. If the flaps are not pivoted, the air flows merely through the main air channel and issues from the air outlet section substantially without deflection. If at least one of the flaps is pivoted then air flows by way of the associated air channel into the main air channel and deflects the air flow through the main air channel. The curvature of the air outlet section in that case assists air deflection. A single drive unit is sufficient to pivot the different flaps. In the prior art, usually a separate drive unit is always required for adjusting air guide elements or other devices.

In the air vent described herein the control element producing pivotation of the flaps is coupled with the drive unit so that movement of the control element by way of the drive unit automatically produces pivotation of the flaps. For that purpose, the control unit is moved by way of the drive unit. The movement usually takes place in circulatory manner, the control element being led past the respective flaps. Depending on the flow cross-section of the air vent the control element is then moved substantially circularly or elliptically or on a rectangular guide path. If the guide path is rectangular the corners can be appropriately radiused, wherein appropriate guides or guidance assists can be provided. This enables pivotation of flaps, which, for example, are arranged oppositely, by a single control element and a single drive unit. In further forms of embodiment a plurality of flaps which close respectively corresponding air channels can be provided.

The at least one control element can be arranged at a control member. The control member in the case of, for example, an air vent with a very wide and rectangular flow cross-section can be formed by a chain, a cable or another flexible element. This is guided around by way of appropriate guides and depending on the position of the control element in that case produces pivotation of the flaps arranged in this region. Guidance aids for guidance of a chain, a cable or another flexible element can be gearwheels, pinions, guide rollers or similar.

It is obviously also possible for two, three or more control elements to be arranged at a control member instead of a single control element. As a result, it is possible to pivot several flaps simultaneously. In addition, it is possible— depending on the construction of the control element—to pivot one flap fully even though at least one second flap is pivoted only partly. The state of the respective flaps then depends on the position of the control elements and the mutual spacing thereof.

In further forms of embodiment the control member can be of annular construction and comprise two control elements arranged at a mutual spacing. An annular construction of the control member can be realised as, for example, a cam disc, in which case two control elements formed as cams are arranged at the cam disc. An annular control element can, for example, be used in air vents with a round cross-section.

The control member can additionally have an encircling gearwheel section coupled with the drive unit. The gearwheel section is, for example, disposed in meshing couple with a drive wheel of an electric motor. As a result it is possible through operation by means of button input or operation of other setting elements to achieve motorised change of the direction of the output air by way of the air vent. In that case only a single electric motor is required and endless operation can be achieved. This means that forward and return movement of the electric motor does not have to take place, but that this can be actuated in just one rotational direction. In addition, it is possible to set different outflow modes. For example, a so-called fan function can be achieved, in which case the electric motor permanently moves the control element so that there is a circulating air deflection.

In further forms of embodiment the flaps are each coupled with a spring device and the spring devices urge the flaps into the starting setting thereof. The spring devices ensure that after pivotation of the flaps these are automatically guided back again to their starting setting after the control element, for example a cam, has passed the corresponding flap. It is possible to use leg springs, for example, as spring devices, in which case the legs are appropriately supported on the surfaces of a housing and the surface of a flap.

In further forms of embodiment the flaps each comprise a pivot arm which protrudes from the flaps. The pivot arm serves for pivotation of the flaps, in which case a control element when moving past produces displacement of the pivot arm and thus pivotation of the flaps. The arrangement of the pivot arm at the flaps depends on the construction of the air vent and the construction of the control element. The pivot arms are preferably so arranged that these are not oriented directly into the main air channel or to face this and a control member, for example a cam disc, is guided outside the main air channel and the air channels surrounding the main air channel.

In further forms of embodiment the at least one control element has at least one lobe chamfer or cam section and a section extending parallel to a base surface. The base surface is defined by the flap surface. A slow opening is produced by pivotation of the flap by way of the lobe chamfer or the cam section on travel past the control element of the flap, which has, for example, a pivot arm, wherein the flap is disposed in the maximum pivoted state by way of the section extending parallel to the base surface. Subsequently, a further lobe chamfer or a cam section can be provided at the control element so that a continuous and slow closing of the corresponding air channel by pivotation of the flap takes place.

In a further form of embodiment a pivot arm is arranged with respect to a flap outwardly at an angle >90° and the spacing of the lobe chamfers or cam sections of two control elements at an annular control member at which the control elements are arranged is 76°. In such an embodiment, which is provided for, for example, a round air vent, the air vent has four air channels surrounding a round main air channel. Essential control actions with respect to the flaps can be achieved by way of the two control elements at the annular control member and the corresponding spacing of the lobe chamfers, in which case a neutral setting with non-pivoted flaps, a pivotation of all flaps individually and a complete pivotation of one flap in company with partial pivotation of a flap adjacent thereto are possible. This is possible for all four flaps in any combination.

In further forms of embodiment in which a greater or lesser number of flaps is provided different angular spacings can be required for a round air vent. The angular spacings obviously also depend on the construction of the control elements or the cams of a cam disc.

In further forms of embodiment the main air channel has a circular cross-section and the opposite sections form an encircling constriction in the main air channel. In addition, in this preferred form of embodiment at least four air channels surround the main air channel and open by way of the outlet openings thereof into the main air channel.

In further forms of embodiment the drive unit comprises an electric motor. The electric motor can be disposed in engagement with a toothed, encircling section of a cam disc or a control member by way of, for example, a drive pinion.

In still further forms of embodiment a gearwheel section of a cam disc or a control member can be actuated by an appropriate mechanical coupling through a control wheel.

BRIEF DESCRIPTION OF THE DRAWINGS

Further advantages, features and possibilities of embodiment are evident from the following figure-based description of embodiments, which are to be understood as non-limiting.

In the drawings.

Parts provided in the drawings with the same reference numerals substantially correspond with one another insofar as nothing to the contrary is indicated. In addition, description of components not essential to an understanding of the technical teaching disclosed herein has been dispensed with.

DETAILED DESCRIPTION OF THE INVENTION

FIGS. 1 to 10 show an exemplifying construction of an air vent 10 of the teaching described herein. However, the illustrated form of embodiment does not have the purpose of limiting the disclosed teaching.

Figure 1:
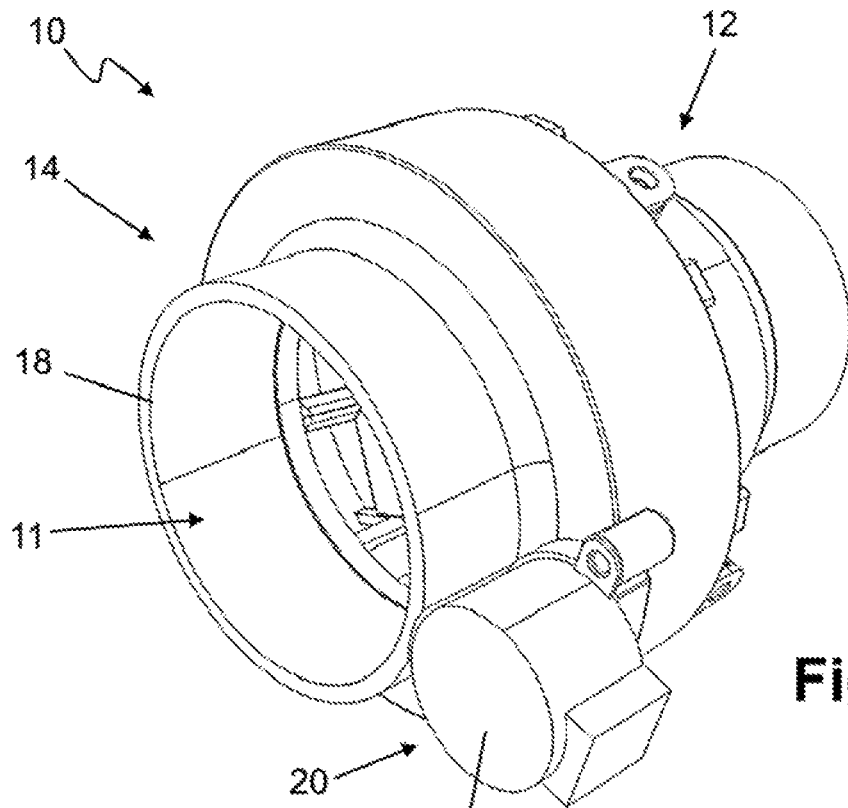
FIG. 1 shows a perspective illustration of an air vent.

FIG. 1 shows a perspective illustration of an air vent 10. In this form of embodiment the air vent 10 has a front housing part 12 and a rear housing part 14. A drive unit 20, which comprises an electric motor 21, is arranged at the rear housing part 14. The electric motor 21 is connected with a gearwheel section 38 and a cam disc 36 by way of a drive wheel 44.

The rear housing 14 has a connection 18. Coupling to an air feed channel in a ventilating system of a vehicle is produced by way of the connection 18. By way of the connection 18 there is fed to the air vent 10, for example, air from an air-conditioning installation. An air inlet section 11 by way of which the supplied air passes to the air vent 10 is connected with the connection 18.

Figure 2:
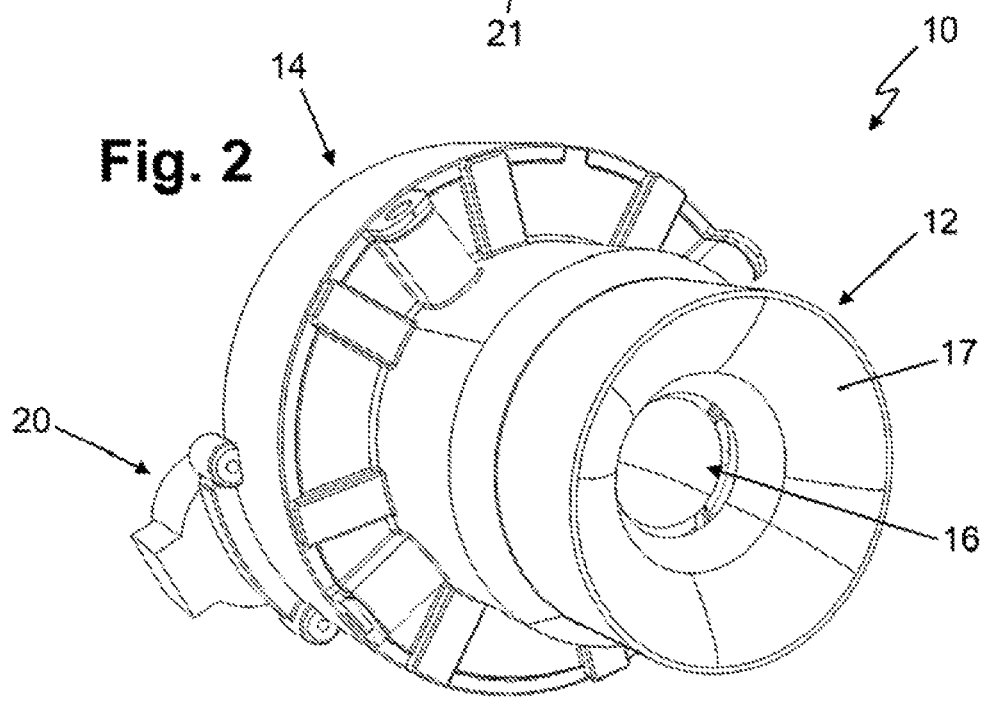
FIG. 2 shows a further perspective illustration of the air vent of FIG. 1.

FIG. 2 is a further perspective illustration of the air vent 10. FIG. 2 shows the front view of the air vent 10 and the front housing part 12. The front housing part 12 is fixedly connected with the rear housing part 14 so that there is no issue of air between the two housing parts 12 and 14. The front housing part 12 has a outlet opening 16 which is present in an air outlet section 17. The air outlet section 17 is formed to be curved so that air deflection with use of Coanda effect can be achieved.

Figure 3:
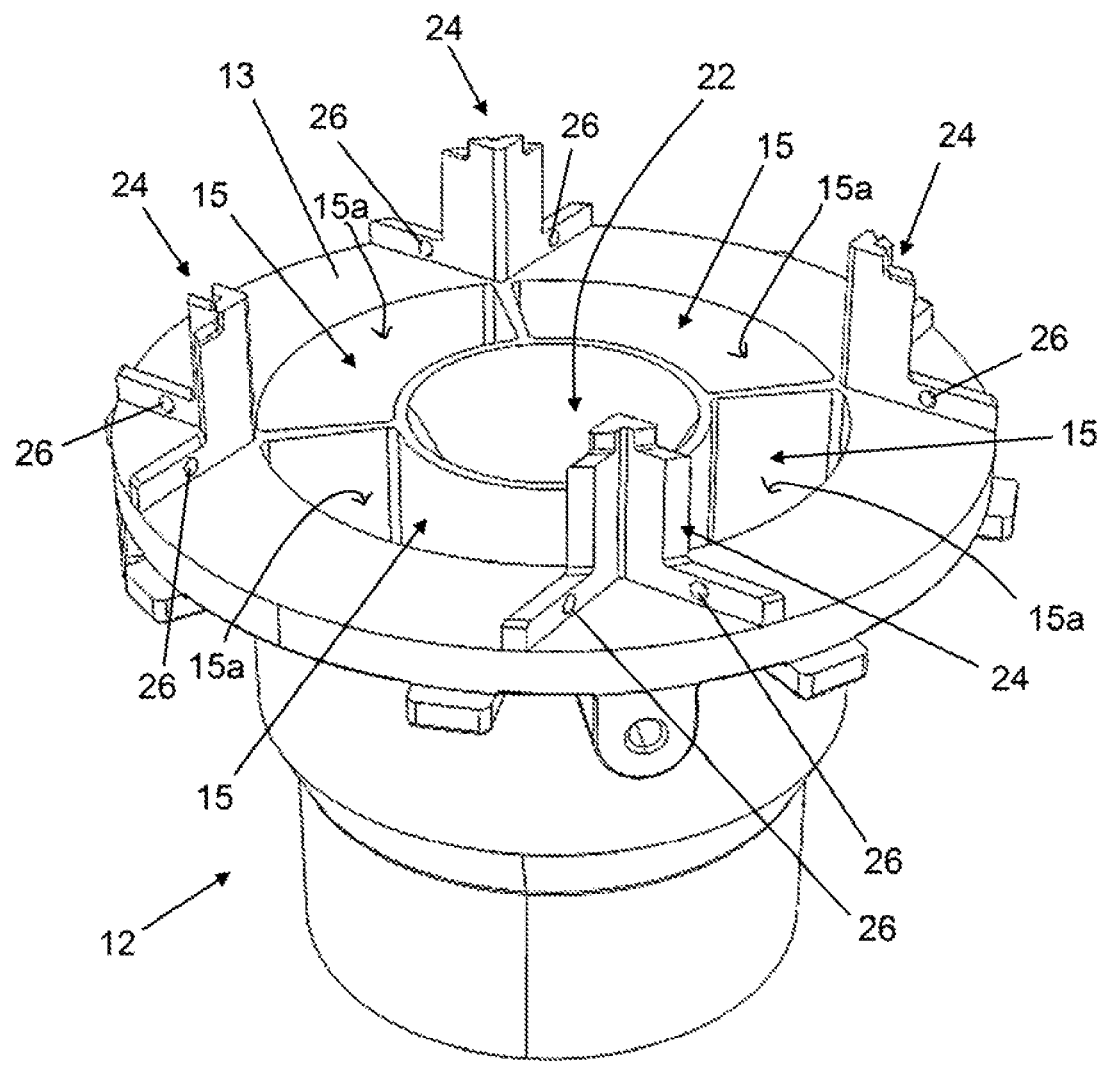
FIG. 3 shows a perspective illustration of a front housing part of the air vent of FIG. 1.

FIG. 3 shows a perspective illustration of the front housing part 12 of the air vent 10. The housing part 12 has a ring 13. Mounting webs 24 are arranged at the ring 13. The mounting webs 24 have openings 26. Bearing shafts 30 of flaps 28 are mounted by way of the openings 26. The flaps 28 are rotatably mounted in the openings 26 by way of the bearing shafts 30. The ring 13 surrounds four air channels 15 and a central air channel 22, which serves as main air channel. The air channels 15 are of substantially the same form and surround the main air channel or air channel 22. Air can be introduced into the air channels 15 in dependence on the setting of the flaps 28 and flows by way of front inlet openings 15a of the air channels 15 into the air channel 22 and thus produces air deflection.

The mounting webs 24 have incisions at the upper end thereof, which incisions conjunctively provide a rotatable mounting for the cam disc 36.

Figure 4:
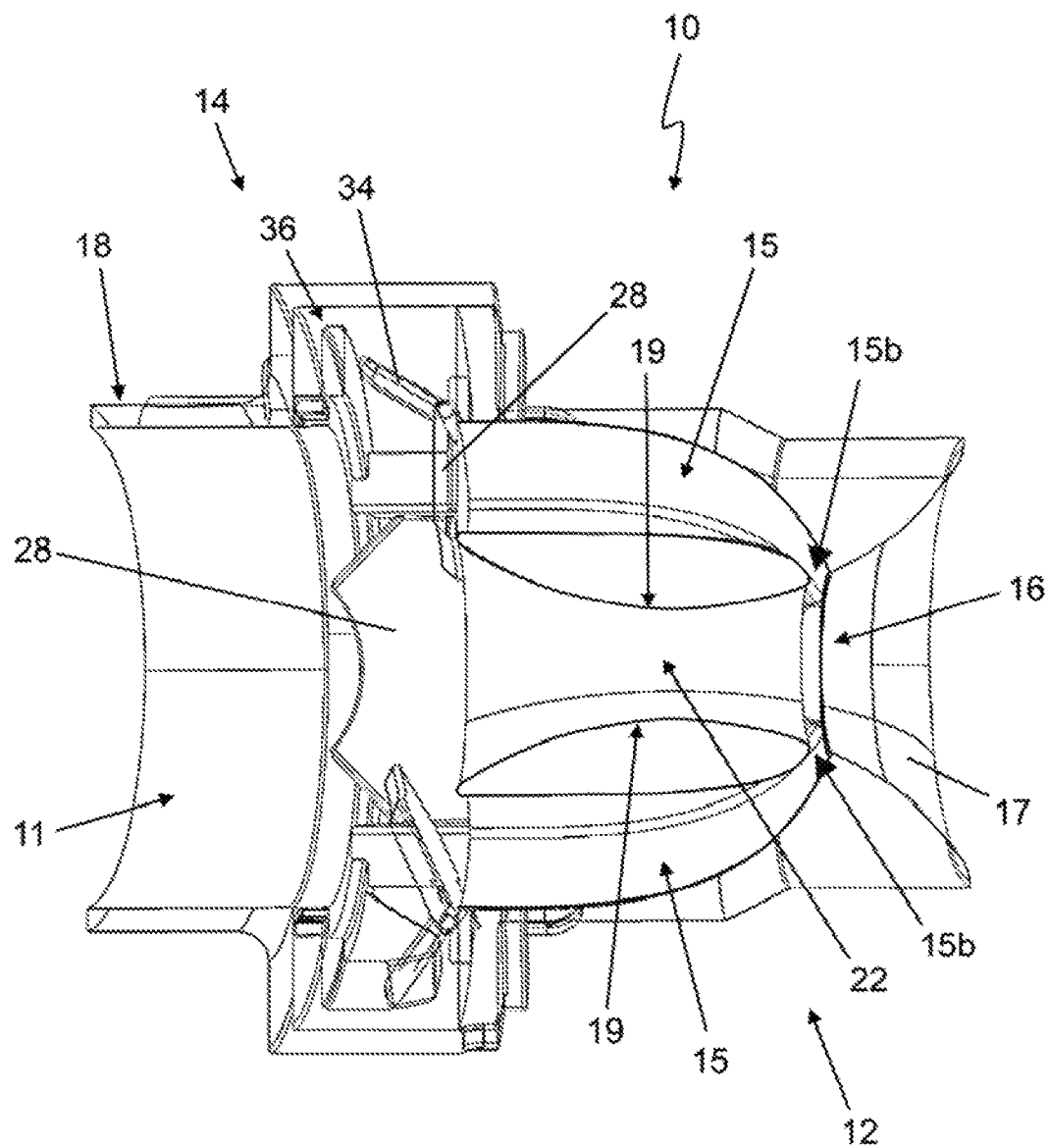
FIG. 4 shows a schematic sectional view of the air vent of FIG. 1.

FIG. 4 shows a schematic sectional view, without cross-hatching, of the air vent 10. In the view shown in FIG. 4 one flap 28 is fully pivoted and an adjacent flap 28 partly pivoted. The pivotation of the flaps 28 takes place in dependence on the position of cams 40 arranged at the cam disc 36. For that purpose the cams 40 press against pivot levers 34, which are arranged at the flaps 28.

As illustrated in FIG. 4, the air channel 22 has sections 19 which starting from the air inlet section 11 narrow the air channel 22 and towards the air outlet section 17 widen it again. The air channels 15 have a flow cross-section reducing towards the air outlet section. Acceleration of the entering air via inlet openings, which can be closed by way of the flaps 28, is thereby achieved. The air channels 15 communicate with the air channel 22 by way of outlet openings 15b. If air is introduced into the air channel 22 by way of one of the air channels 15 the resulting air flow from the air channel 15 and the air channel 22 is correspondingly deflected. The air flow issuing from one of the air channels 15 in that case 'urges' the air flow from the air channel 22 correspondingly upwardly or downwardly or to the side. The deflected air flow, which consists of the air flow from the air channel 22 and least one air channel 15, then flows with utilisation of Coanda effect along the curved region of the air outlet section 17 and follows the curvature, so that a directed air flow issues from the air vent 10.

In the air vent 10 it is possible to achieve by way of the cam disc 36 with the two cams 40 not only pivotation of a flap 28, but also full pivotation of one flap 28 together with partial pivotation of an adjacent flap 28. In addition, the air vent 10 is of round form and the air channel 22 has a round cross-section, so that air deflection in any direction is possible. The sections 19 are part of an encircling constriction of the air channel. This at the same time assists deflection of the outflowing air in any desired direction. In order that a further and finer distribution of outflowing air is possible, in further forms of embodiment (not illustrated) several air channels 15 and correspondingly several flaps 28 can be provided.

Figure 5:
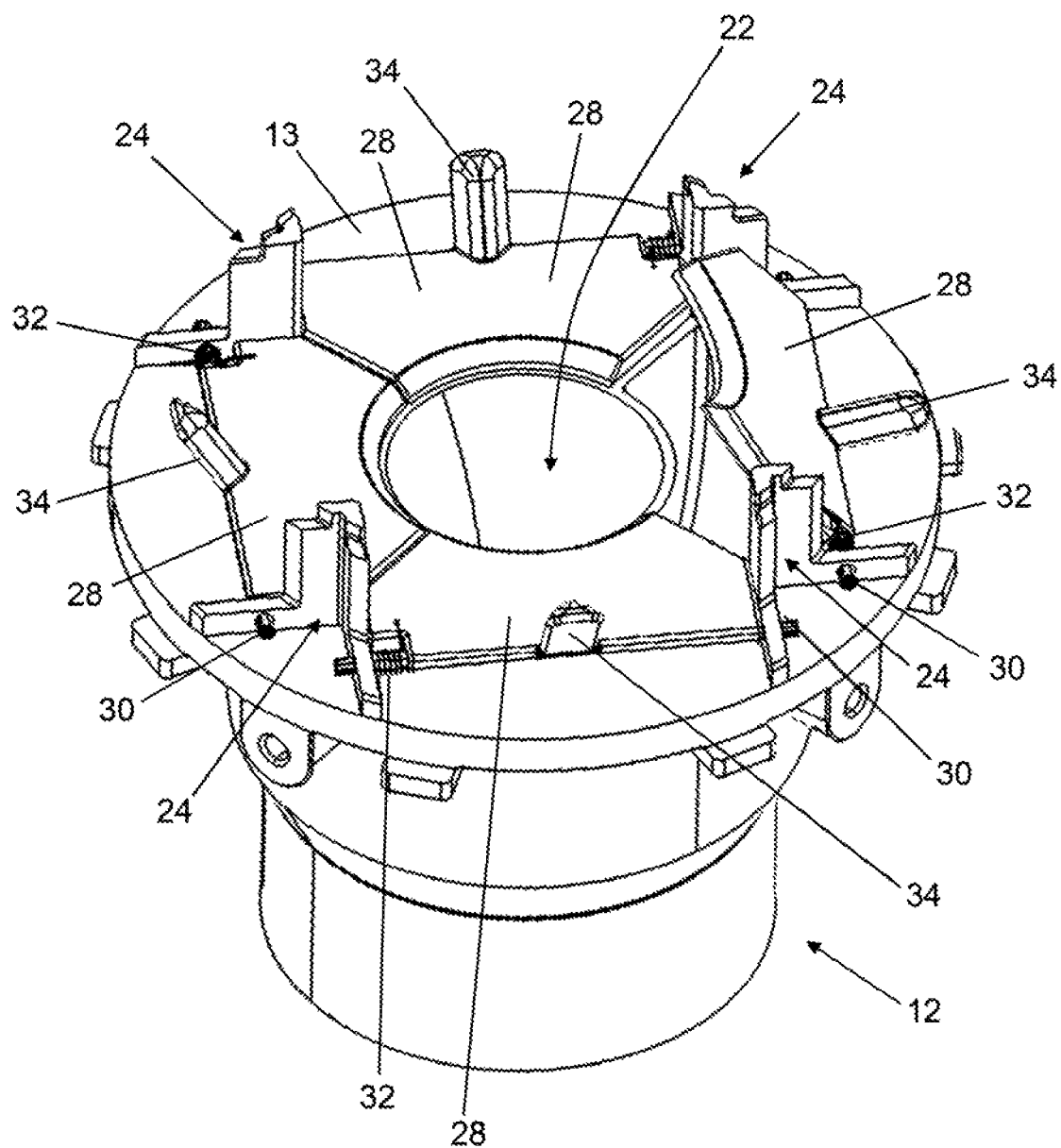
FIG. 5 shows a perspective illustration of the front housing part of the air vent of FIG. 1 with flaps pivotably mounted thereon.

FIG. 5 shows a perspective illustration of the front housing part 12 of the air vent 10 with flaps 28 pivotably mounted thereon. As illustrated in FIG. 5, only one flap 28 is pivoted, in which case a cam 40 (not illustrated) for that purpose presses against the pivot lever 34.

The flaps 28 are constructed so that these completely close the inlet openings 15a of the air channels 15, but leave the air channel 22 free. In addition, the flaps 28 at the sections surrounding the air channel 22 are of radiused form so that supplied air is not subject to turbulence.

The flaps 28 are mounted in the openings 26 of the mounting webs 24 by way of bearing shafts 30 and each have a leg spring 32. The legs of the leg springs 32 are supported at one end on the ring 13 and at the other end against the surface of the flaps 28. As a result, after pivotation of the flaps 28 an automatic return of the flaps 28 to the starting setting thereof, in which the flaps 28 close the air channels 15, is achieved.

Figure 6:
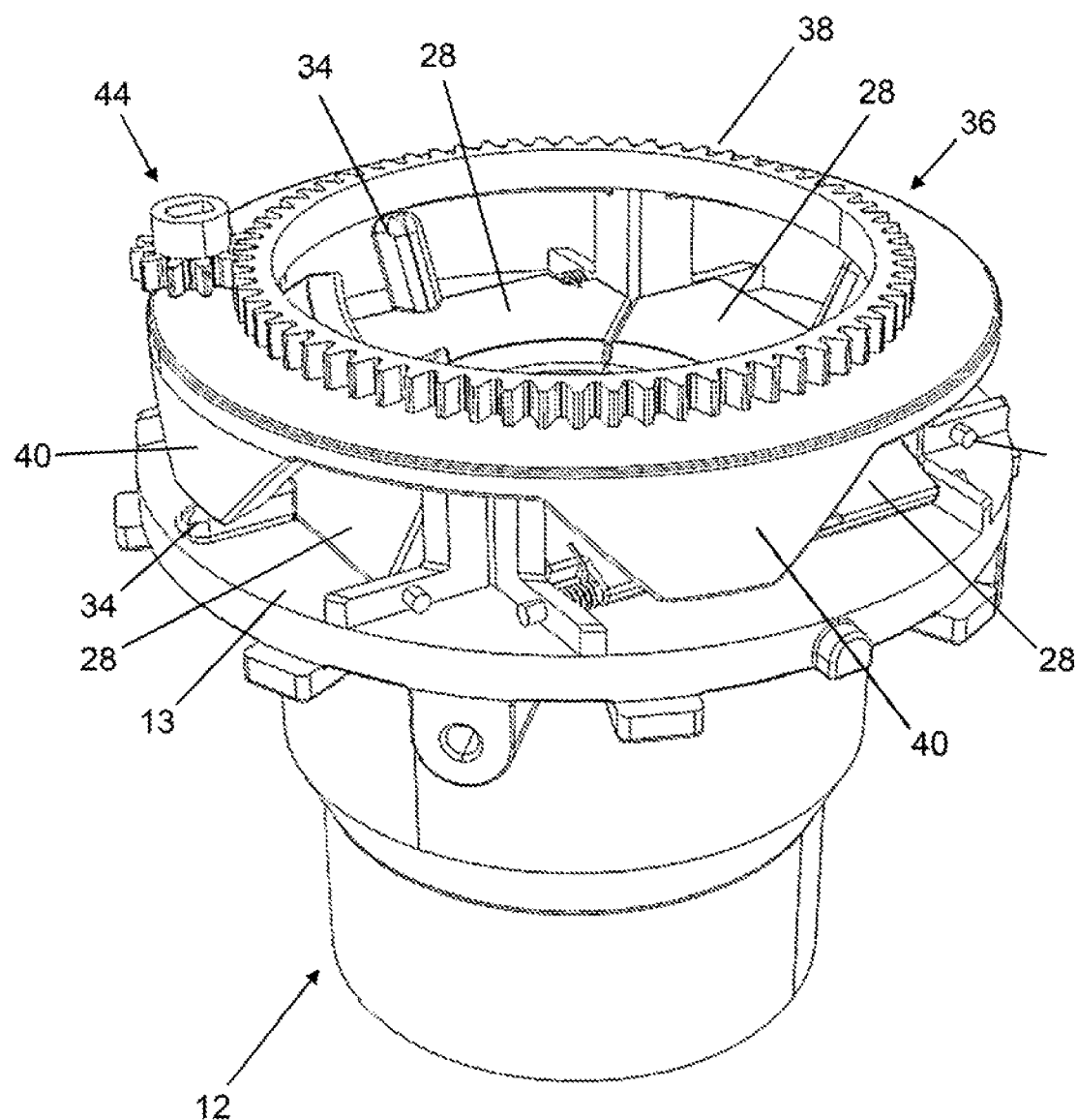
FIG. 6 shows a perspective illustration of the front housing part of the air vent of FIG. 1 with pivotably mounted flaps, a cam disc, which is constructed as control member, with cams arranged thereon as control elements, and a drive wheel.

FIG. 6 shows a perspective illustration of the front housing part 12 of the air vent 10 with pivotably mounted flaps 28, a cam disc 36, which is constructed as a control member, with cams 40 arranged thereat as control elements, and a drive wheel 44. The teeth of the drive wheel 44 mesh with the teeth of the gearwheel section 38 of the cam disc 36. The drive wheel 44 is coupled with the electric motor of the drive unit 20 so that rotation of the drive wheel 44 produces rotation of the cam disc 36.

The cam disc 36 has two cams 40, which have lobe chamfers 42. If one of the lobe chamfers 42 comes into contact with one of the pivot levers 34 then pivotation of the associated flap 28 takes place. The spacing of two lobe chamfers 42, which face in the same direction, of the cams 40 is 76° in the embodiment of an air vent shown in the figures. It is thereby possible to fully pivot one flap 28 and at the same time to open a second adjacent flap 28, in which case the adjacent flap 28 is only partly pivoted. In particular, through the illustrated construction of the cams 40 with the illustrated lobe chamfers 42 and the sections 46 (see FIG. 9), it is also possible to achieve only opening of one flap 28. Moreover, it is possible during opening of a flap 28 by pivotation to continuously pivot an adjacent second flap 28 until this is fully opened, in which case then the previously fully pivoted flap 28 is partly pivoted or is no longer pivoted. Subsequently, the pivot lever 34 of the originally opened flap 28 slides along the second lobe chamfer 42 of the cam 40 and causes pivotation of the corresponding flap 28 back into the starting state thereof, as a result of which the corresponding air channel 15 is closed.

The different pivoted settings of two adjacent flaps 28 and the simultaneous pivotation of one flap 28 and closing of an air channel 15 by an adjacent flap 28 are possible by virtue of the sections 46. Depending on the position of the cams 40, the pivot levers 34 are disposed at a front position of the section 46, at a middle position of the section 46 or a rear position of the section 46 or then are disposed in the region of the lobe chamfers 42 or have passed these.

Figure 7:
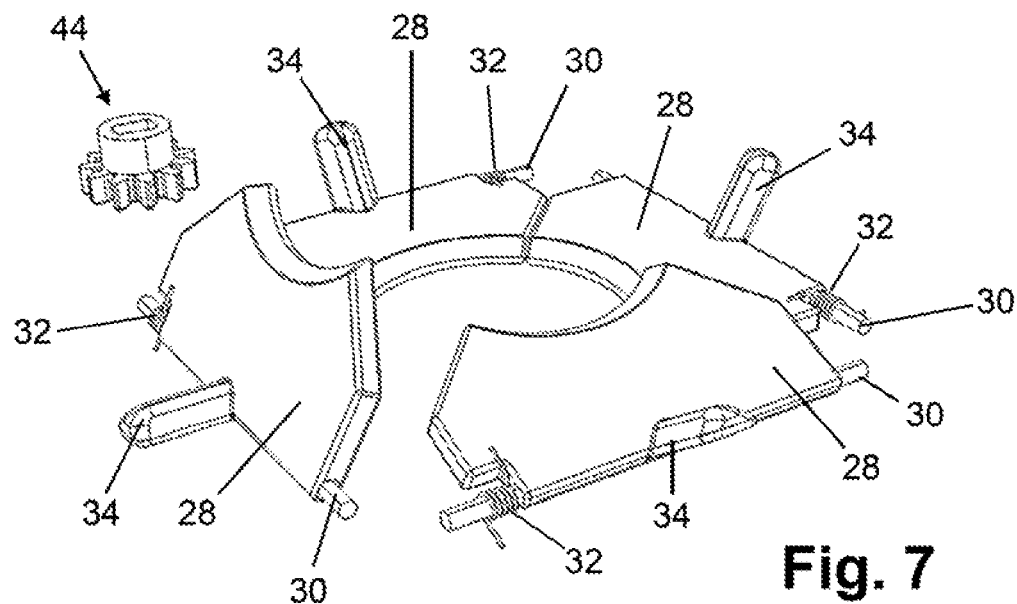
FIG. 7 shows a perspective illustration of the flaps and the drive wheel of the air vent of FIG. 1.

FIG. 7 shows a perspective illustration of the flaps 28 and of the drive wheel 44 of the air vent 10. FIG. 7 shows the state of the partly pivoted flap 28 and completely pivoted flap 28 of the setting shown in FIG. 6. The flap 28 which has been completely pivoted (lefthand flap 28) includes between its upper side and the ring 13 (not illustrated in FIG. 7) an angle of >90°. This lies at the arrangement of the pivot lever 34, which is similarly fastened to the upper side of the flap 28 at an angle >90° thereto. In the completely pivoted setting of the flap 28 the pivot lever 34 rests on the ring 13. Further pivotation is therefore not possible. In addition, the construction of the cams 40 determines to what extent pivotation of the pivot levers 34 takes place. This depends entirely on the form of embodiment and the desired possible air deflections of air vents. In further embodiments different angles can be provided between the pivot levers 34 and the flaps 28. In addition, the maximum pivotability of the flaps 28 is sufficient for the air vents 10 shown in the figures, since the width of the connection 18 and thus the air feed section 11 is appropriately smaller than the diameter of the ring 13 (see FIG. 4).

Figure 8:
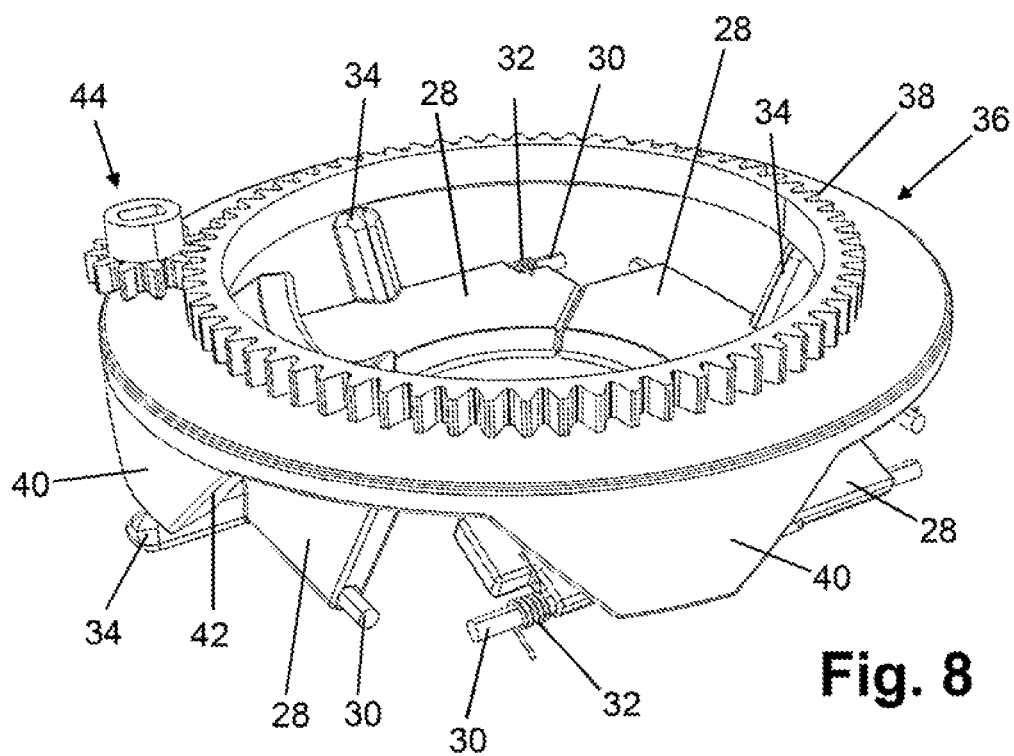
FIG. 8 shows a perspective illustration of the flaps, the cam discs and the drive wheel of the air vent of FIG. 1.

FIG. 8 shows a perspective illustration of the flaps 28, the cam disc 36 and the drive wheel 44 of the air vent 10. As illustrated in FIG. 8, the lefthand cam 40 is disposed, by its flat section 46 extending parallel to the encircling annular surface of the cam disc 36, over the pivot lever 34. The pivot lever 34 is thereby fully pressed onto the ring 13. The pivot lever 34 of the adjacent flap 28 arranged on the right thereof is urged slightly downwardly by way of the lobe chamfer 42 of the righthand cam 40 (see also FIG. 7) so that this flap 28 is already slightly pivoted.

Figure 9:
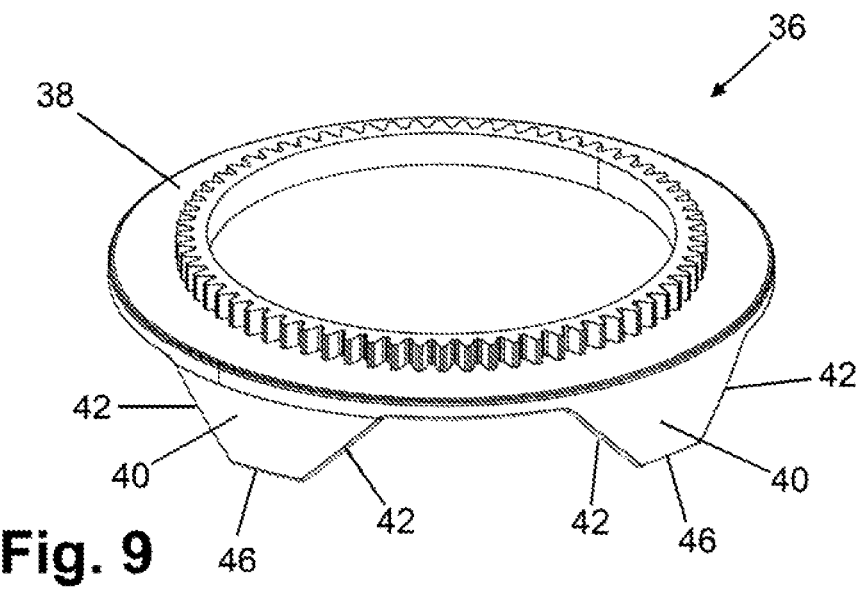
FIG. 9 shows a perspective illustration of the cam disc with two cams of the air vent of FIG. 1.

How quickly the flaps 28 are pivoted depends on, inter alia, the form of the lobe chamfers 42. If these have a steeper path, then more rapid pivotation of the flaps 28 takes place. The width of the sections 46 of the respective cams 40, as illustrated in FIG. 9, determines how far two flaps 28 can be simultaneously pivoted. In that case, the spacing of the two cams 40 as well as the width of the sections 46 and the form of the lobe chamfers 42 are decisive. Instead of the lobe chamfers 42, in further forms of embodiment curve-like lobe chamfers can also be provided, these having convex and/or concave curvatures which produce a correspondingly slow or fast pivotation of the flaps 28.

The construction of the cam disc 36 in the air vent 10 shown in the figures enables complete pivotation of each flap 28 individually and pivotation of two adjacent flaps 28 into different pivot positions relative to one another. This is achieved by the offset arrangement of the two cams 40 as well as the offset start, for example of the two lobe chamfers 42 disposed on the right, by 76°.

Figure 10:
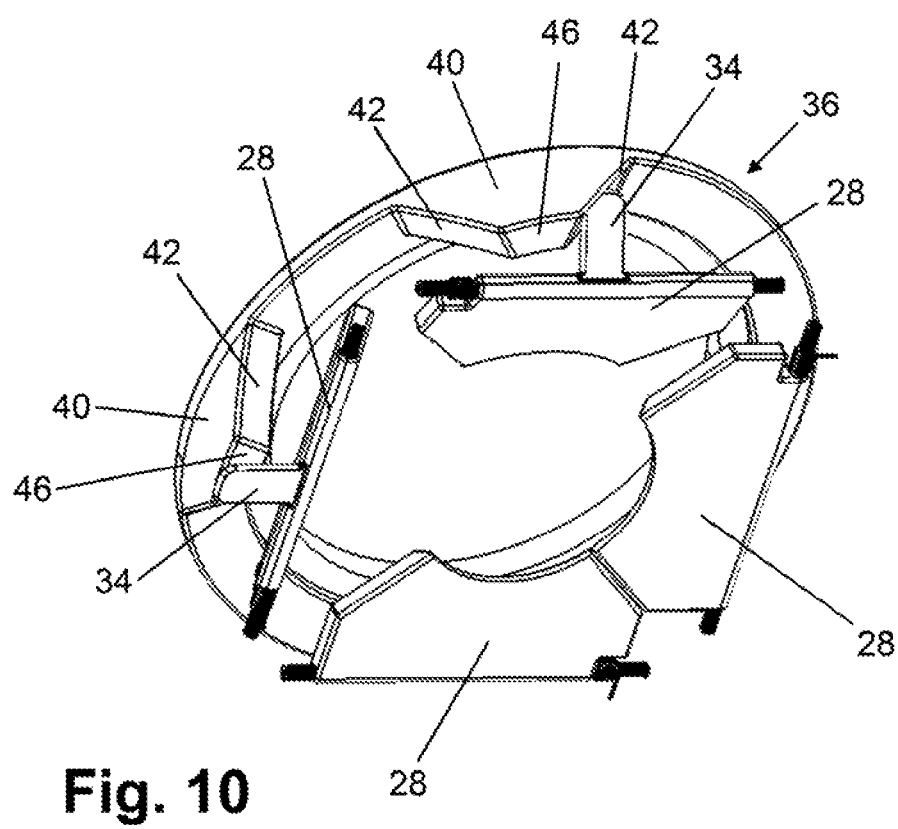
FIG. 10 shows a further perspective illustration of the flaps and the cam disc of the air vent of FIG. 1.

FIG. 10 shows a further perspective illustration of the flaps 28 and the cam disc 36 of the air vent 10 with a view from below. The illustration of FIG. 10 clarifies the simultaneous pivotation of two flaps 28, wherein one flap 28 is completely pivoted by way of the pivot lever 34 thereof and the other flap 28 is only slightly pivoted. In the case of the lefthand flap 28, the pivot lever 34 is urged fully downwardly by way of the section 46 of the cam 40. The adjacent pivot lever 34 of the flap 28 is disposed in the region of a lobe chamfer 42 and is therefore not fully urged downwardly. Accordingly, the associated flap 28 is in a setting which is not completely pivoted. The other two flaps 28 are not pivoted, since the pivot levers 34 thereof are not urged downwardly by a cam 40. In addition, the leg springs 32 cause the flaps 28 to remain in the position thereof.

The air vent 10 enables pivotation of the flap 28 by way of a single drive unit and thus provision of an air flow in all directions by way of a slat-free air vent. By comparison with known air vents from the prior art, no deflecting means such as slats or suchlike are therefore required. In addition, a slat-free air vent 10 is provided which does not need a plurality of drive units or means for providing over-pressure and/or sub-atmospheric pressure.

REFERENCE NUMERAL LIST 10 air vent
11 air inlet section
12 housing part
13 ring
14 housing part
15 air channel
15a inlet opening
15b outlet opening
16 outlet opening
17 air outlet section
18 connection
19 section
20 drive unit
21 electric motor
22 air channel
24 mounting web
26 opening
28 flap
30 bearing shaft
32 leg spring
34 pivot lever
36 cam disc
38 gearwheel section
40 cam
42 lobe chamfer
44 drive wheel
46 section

The invention claimed is:

1. An air vent comprising a housing with an air inlet section, a main air channel and an air outlet section, wherein the main air channel has at least two opposite sections which reduce the size of the main air channel starting from the air inlet section and from the air outlet section, wherein at least two air channels which open by way of outlet openings into the main air channel are arranged along the at least two opposite sections and wherein for each of the at least two air channels a respective pivotably mounted flap, which pivotably mounted flap in an unactuated setting in which the pivotably mounted flap is in its starting setting closes its respective air channel, is arranged in the region of an inlet opening of the respective air channels, and further comprising at least one control element and a drive unit, the at least one control element being coupled with the drive unit, and the flaps being pivotable by way of the at least one control element for closing the respective inlet openings, wherein the at least one control element has at least one lobe chamfer or cam and a section extending parallel to a base surface.

2. The air vent according to claim 1, wherein the at least one control element is arranged at a control member.

3. The air vent according to claim 2, wherein the control member is of annular construction and comprises two control elements arranged at a spacing from one another.

4. The air vent according to claim 3, wherein the control element has an encircling gearwheel section coupled with the drive unit.

5. The air vent according to claim 1, wherein the flaps are each coupled with a spring device, which each spring devices urges its respective flap into the starting setting thereof.

6. The air vent according to claim 1, wherein the flaps have a pivot lever protruding from the flaps.

7. The air vent according to claim 1, wherein a pivot arm is arranged with respect to a flap outwardly at an angle greater than 90° and the spacing of the lobe chamfers or the cams of two control elements at an annular control member at which the control elements are arranged is seventy-six degrees wherein the annular control member is a cam disc.

8. The air vent according to claim 1, wherein
the main air channel has a circular cross-section and the opposite sections form an encircling constriction in the main air channel and
at least four air channels surround the main air channel and open into the main air channel by way of outlet openings.

9. The air vent according to claim 1, wherein the drive unit comprises an electric motor.

* * * * *

UNITED STATES PATENT AND TRADEMARK OFFICE
CERTIFICATE OF CORRECTION

PATENT NO. : 10,792,979 B2
APPLICATION NO. : 16/074740
DATED : October 6, 2020
INVENTOR(S) : Gruenbeck Page 1 of 1

It is certified that error appears in the above-identified patent and that said Letters Patent is hereby corrected as shown below:

On the Title Page

Item (71) Applicant, "DR. SCHNEIDER KUNSTSOFFWERKE GMBH, Kronach (DE)" should be --DR. SCHNEIDER KUNSTSTOFFWERKE GMBH, Kronach (DE)--.

Item (22) PCT Filed, "Jun. 19, 2017" should be --Jun. 9, 2017--.

Signed and Sealed this
Eighth Day of October, 2024

Katherine Kelly Vidal
*Director of the United States Patent and Trademark Office*